United States Patent [19]
Lien

[11] Patent Number: 5,396,492
[45] Date of Patent: Mar. 7, 1995

[54] METHOD AND APPARATUS FOR ADAPTIVE CLOCK RECOVERY

[75] Inventor: Robert L. Lien, Batavia, Ill.
[73] Assignee: AT&T Corp., Murray Hill, N.J.
[21] Appl. No.: 54,332
[22] Filed: Apr. 28, 1993
[51] Int. Cl.$^6$ ............................................. H04J 3/06
[52] U.S. Cl. .................................... 370/60; 370/108; 375/371
[58] Field of Search ............... 370/84, 94.1, 108, 94.2, 370/60, 60.1; 375/118

[56] References Cited
U.S. PATENT DOCUMENTS

| | | | |
|---|---|---|---|
| 3,754,098 | 8/1973 | Abramson et al. | 375/118 |
| 4,759,041 | 7/1988 | Anderson et al. | 370/108 |
| 5,142,529 | 8/1992 | Parruck et al. | 370/84 |

OTHER PUBLICATIONS

R. C. Lau, "A Clock Recovery Scheme for ATM Circuit Emulsion", Bellcore, Oct. 10, 1988.
K. Yamazaki, "Introduction to AAL type 1", Document AVC-214, Mar. 9, 1992.

Primary Examiner—Benedick V. Safourek
Assistant Examiner—Min Jung
Attorney, Agent, or Firm—Jack R. Penrod; Ross T. Watland

[57] ABSTRACT

An adaptive clock recovery arrangement for deriving a synchronous clock from an asynchronous, packet stream such as an asynchronous transfer mode (ATM) cell stream. The deviation in the magnitude of information stored in a first-in-first-out memory is continually monitored, and the synchronous clock frequency, referred to as the adaptive line clock frequency, is adjusted in a plurality of modes, under the control of a processor. The adjustment is made in response to a detected increasing condition of the monitored deviation. The adjustments are open-loop adjustments made without continually adjusting the adaptive line clock frequency based on the monitored deviation. Damping is substantially reduced compared with "conventional" PLL arrangements because the open-loop adjustments result in a rapid frequency correction with perfect or nearly perfect deadbeat damping, i.e. without the frequency oscillations that continue after the correct frequency is reached in closed-loop arrangements.

27 Claims, 10 Drawing Sheets

METHOD AND APPARATUS FOR ADAPTIVE CLOCK RECOVERY

TECHNICAL FIELD

This invention relates to communications systems.

BACKGROUND AND PROBLEM

In recent years, many telephone, video and data communication systems have been developed where digital data streams are encoded into short packets or cells instead of using synchronous transmission. The evolving world-wide standard for this packet-based transmission and switching technology is called Asynchronous Transfer Mode (ATM). Although networks are evolving to ATM transmission, interfaces are needed to present-day synchronous switching and transmission systems and to end-point terminal equipment. Voice and video channels invariably require constant bit rate, synchronous interfaces. The process of converting from ATM, or other packet-based transmission, to a constant bit rate synchronous system basically requires two steps. The first step is extracting the cell payload data, which carries the synchronous bit stream, and storing it in a first-in-first-out (FIFO) memory. The FIFO acts as an elastic store to smooth out the bursty cell arrival. The second step is to recover or derive a clock, based on the average data arrival bit rate, and use the derived clock to clock data out of the FIFO and into a transmission interface circuit for transmission. Adaptive clocking is a name for the process of deriving an accurate clock rate from the data rate of the arriving cell/packet stream.

The ATM cell stream is often bursty with short term variations in the cell arrival rate, which are on the order of one millisecond for some ATM systems. The derived (adapted) clock rate must stablize in seconds to a typical level of a few parts-per-million (ppm), and in the long term, must track the source rate exactly. Requirements vary widely between different systems and applications. Integrating the number of arriving ATM cells over a period of time is the fundamental technique in determining the mean clock rate. Long integration times can be used to produce a low jitter, narrow-band clock output. However, relatively long integration times cause a host of stability problems if a "conventional" phase-locked-loop (PLL), e.g., arrangement 210 (FIG. 10) described herein, is applied to this application. The integration time is directly related to feedback delay in the PLL control loop, which tends to make closed loop control systems unstable. Additionally, the adaptive clock slew rate must be limited, which causes more feedback delay. The damping factor will be large causing slow response and unstable operation. The use of phase-lead or multiple pole circuits, in the loop of a "conventional" PLL, to control damping is not practical because the cell stream has too much jitter to derive needed phase-lead information over short intervals. Another way to state this is that the signal to noise ratio of input phase/frequency information does not facilitate use of a two-pole filter in a "conventional" PLL. Without the use of multiple poles in an (extremely) narrow-band PLL, the damping factor cannot be effectively adjusted to provide stable operation in this application. A "conventional" PLL with sufficient gain and narrow-band characteristics has been found to oscillate.

In addition to solving the above mentioned response damping problem, an adaptive clock recovery circuit should: (1) develop a low jitter (narrow-band) clock from the bursty ATM input stream; (2) have good or near ideal damping stability; (3) have fast response which is limited only by the necessary integration of jitter; (4) have sufficient gain (FIFO level control) to meet clock tracking and wander specifications; (5) have controlled clock slew rates; (6) maintain a precise jitter build-out delay (the elastic FIFO store queuing level); and (7) be adjustable by parameters and suitable for a range of applications and requirements.

In view of the foregoing, a need exists in the art for an improved arrangement for recovering a synchronous clock from an asynchronous packet stream without relying on closed-loop adjustment of the recovered synchronous clock frequency as in "conventional" phase-locked loop (PLL) arrangements.

SOLUTION

This need is met and a technical advance is achieved in accordance with an exemplary embodiment of the present invention where the deviation in the magnitude of information stored in a first-in-first-out memory, e.g., FIFO 15 (FIG. 1) is continually monitored, and where the synchronous clock frequency, referred to herein as the adaptive line clock frequency, is adjusted, advantageously in a plurality of modes, under the control of a processor, e.g., microprocessor 29 (FIG. 1 ). The adjustment is made in response to a detected increasing condition of the monitored deviation. Significantly, the adjustments are open-loop adjustments made without continually adjusting the adaptive line clock frequency based on the monitored deviation. Damping is substantially increased compared with "conventional" PLL arrangements because the open-loop adjustments result in a rapid frequency correction with perfect or nearly perfect deadbeat damping, i.e. without the frequency oscillations that continue after the correct frequency is reached in closed-loop arrangements.

A method in accordance with the invention is used in an arrangement comprising a receiver of asynchronous, packetized information, a memory, e.g., a FIFO, that stores the received packetized information, and a transmitter that transmits the stored information on a synchronous circuit in response to an adaptive line clock frequency. The method includes continually monitoring the deviation in the magnitude of information stored in memory from a nominal value. When an increasing condition of the monitored deviation is detected, the arrangement adjusts the adaptive line clock frequency in a plurality of modes.

Illustratively, in a first mode (ramp_mode 1), the adaptive line clock frequency is overcorrected until after the monitored deviation begins to decrease. In a second mode (ramp_mode 2 or 4), the adaptive line clock frequency is held constant until the monitored deviation has decreased to a predetermined threshold. The illustrative method also includes continually determining an apparent source frequency. In a third mode (ramp_mode 3 or 5), the adaptive line clock frequency is changed until the adaptive line clock frequency is equal to the apparent source frequency. The apparent source frequency is determined based on the monitored deviation and the adaptive line clock frequency. The adjustments made in ramp_modes 1 through 5 are open-loop adjustments, i.e., the adjustments are made: without continually adjusting the adaptive line clock frequency based on the monitored deviation. The monitored deviation is integrated to filter out data jitter. To minimize processing time, no multiplications are used in the algorithms. Most divisions have power of two divisors which are compiled to a left shift operation.

DRAWING DESCRIPTION

DETAILED DESCRIPTION EXEMPLARY EMBODIMENT

Figure 1:
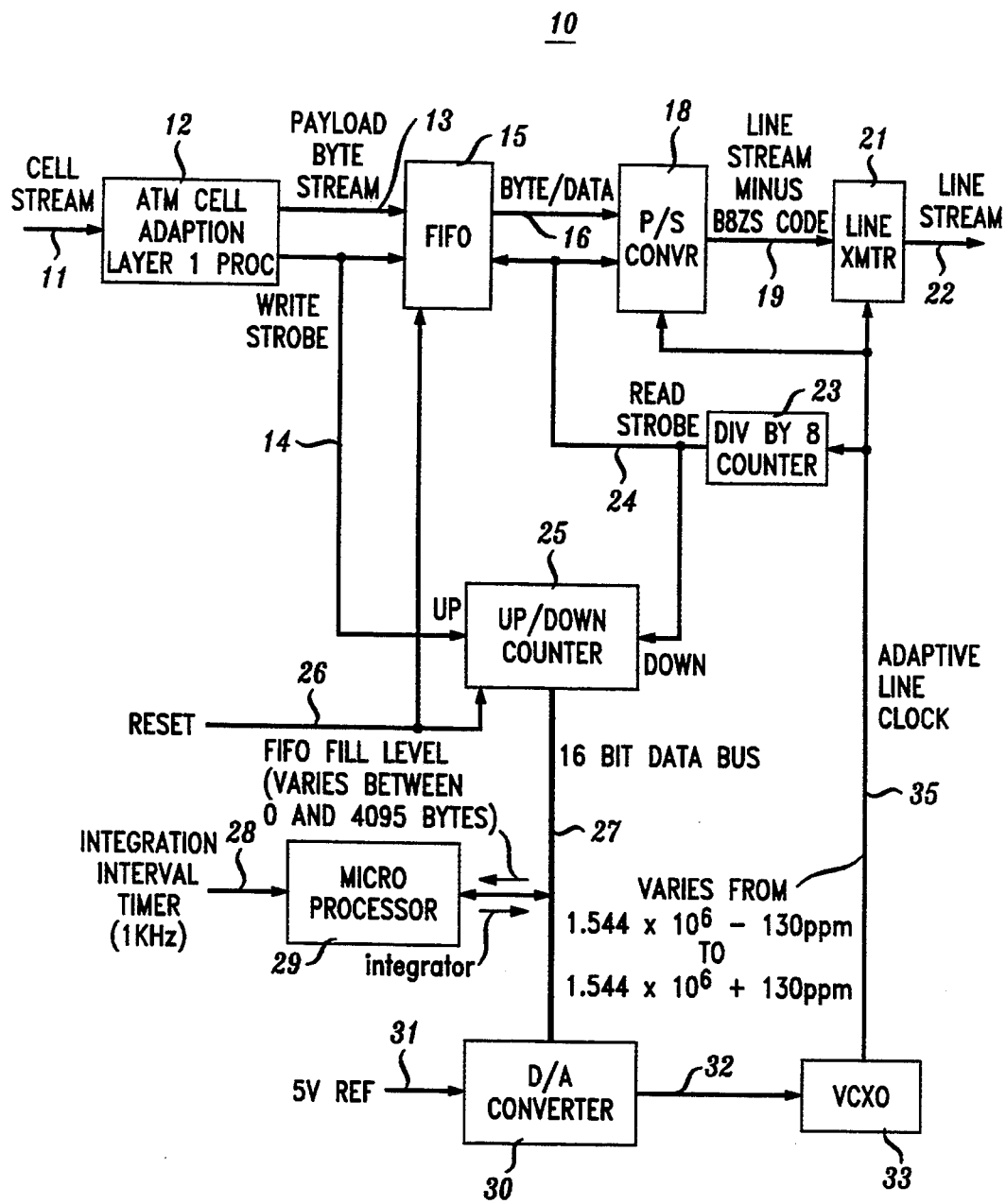
FIG. 1 is a circuit diagram of an exemplary adaptive clock recovery arrangement in accordance with the invention.

FIG. 1 is a circuit diagram of an exemplary adaptive clock recovery arrangement 10 used at the interface from a 155 megabits per seconds, asynchronous transfer mode (ATM) cell stream on line 11, to a synchronous DS1, 1.544 megabits per second, constant bit rate circuit on line 22. (Other exemplary synchronous rates include DS3=44.736 megabits per second, CEPT1=2.048 megabits per second, and CEPT3=34.368 megabits per second.) As shown in FIG. 1, arrangement 10 includes the hardware used to transmit information from an ATM cell stream onto a synchronous circuit. The hardware needed to transmit information in the other direction—from a synchronous circuit to an ATM cell stream—is not important in the present description and is therefore not shown in FIG. 1. Because of the bursty, asynchronous nature of the incoming cell stream on line 11, the clock needed to transmit information synchronously on line 22 is not derivable by using edge or transition information in the line 11 cell stream; rather it is based on the long term average cell rate on line 11. Each ATM cell on line 11 is a 53-byte packet including a five-byte header, a one-byte adaption layer, and a 47-byte payload of usable information. Each ATM cell represents a burst of 53 bytes at 155 megabits per second; cells arrive asynchronously and are typically separated by relatively long open intervals, e.g., 8 to 243 microseconds. Circuit 12 performs CCITT adaption layer 1 processing, including removal of the five-byte cell header and a one-byte adaption layer, and controls, using a write strobe on line 14, the writing of the 47-byte payload, via a byte bus 13, into a first-in-first-out (FIFO) memory 15. FIFO 15, e.g., an Integrated Device Technology 72241, stores up to 4096, eight-bit bytes—more than adequate to store all the bytes that accumulate awaiting transmission on line 22. FIFO 15 operates in cooperation with an up/down counter 25, e.g., a Fairchild F579, which counts the number of bytes stored in FIFO 15 at any instant. Each time a byte is written from circuit 12 into FIFO 15, the write strobe on line 14 increments counter 25 by one. Each time a byte is read from FIFO 15, the read strobe on line 24 decrements counter 25 by one.

The adaptive line clock on line 35, which is derived as described herein, is used to control the transmission of bytes from FIFO 15 onto the DS1, synchronous circuit on line 22. In the present embodiment, the clock frequency on line 35 may vary from 1.544 megabits per second minus 130 parts per million (ppm), to 1.544 megabits per second plus 130 ppm. This variation is acceptable for synchronous DS1 circuits. This adaptive line clock frequency on line 35 is used to operate a parallel/serial converter 18, e.g., a Fairchild F323, and a line transmitter 21. The line clock frequency is divided by eight by a counter 23, e.g., a Fairchild F161A, and the resulting byte clock on line 24 is used as a read strobe, to effect the reading of a byte of payload information from FIFO 15 via byte bus 16, parallel/serial converter 18, and line 19 for transmission by line transmitter 21 as a DS1 circuit on line 22. Transmitter 21 inserts a B8ZS code into the line stream to prevent more than seven consecutive zero bits from being transmitted on line 22. As previously mentioned, the read strobe on line 24 is also used to decrement counter 25.

A microprocessor 29, e.g., a Motorola 68070, is an important element of arrangement 10 with respect to the derivation of the adaptive line clock on line 35. Microprocessor 29 executes a program (flow charts of FIGS. 4-6) once every millisecond in response to a one kilohertz integration interval timer received on line 28. The program takes on the order of 250 microseconds to execute. The program input is the FIFO fill level as read from counter 25 via a 16-bit data bus 27. The FIFO fill level is a 12-bit number between 0 and 4095 which represents the number of bytes stored in FIFO 15. The program output is a variable "integrator" which is transmitted via bus 27 to a digital/analog (D/A) converter 30, e.g., an Analog Devices 8412, connected via line 31 to a 5-volt reference; the converter 30 output voltage on line 32 is variable from 0 volts to 5 volts. Converter 30 provides via line, 32 the control input signal to a voltage-controlled crystal oscillator (VCXO) 33, e.g., an AT&T S-Type. If converter 30 were to develop 5 volts on line 32 as the control input to VCXO 33, VCXO 33 would transmit an adaptive line clock on line 35 having a frequency of 1.544 megabits per second plus 200 ppm. When converter 30 develops 2.5 volts on line 32, VCXO transmits a frequency of 1.544 megabits per second; if converter 30 were to develop 0 volts on line 32, VCXO would transmit a frequency of 1.544 megabits per second minus 200 ppm. In the present embodiment, the control input signal on line 32 does not vary between 0 and 5 volts; rather it varies such that the adaptive clock frequency on line 35 is controlled between 1.544 megabits per second minus 130 ppm and 1.544 megabits per second plus 130 ppm. Line 32 includes an alias filter (not shown in FIG. 1) to remove the effect of small step functions on line 32. The alias filter has a relatively large RC time constant, e.g., R=2.2k and C=33 microfarads, since it is not necessary to slew the clock on line 35 at a high rate.

Jitter generally is a type of analog-communication-line distortion caused by a signal variation from a reference timing position, which can cause data transmission errors, particularly at high speeds. This variation can be in amplitude, time, frequency or phase. In the present application, jitter more specifically refers to the difference between an expected (periodic) cell arrival time and the actual cell arrival time. Arrangement 10 is designed for a worst case jitter in the incoming cell stream on line 11 of 0.3 millisecond at DS3 to 3 milliseconds at DS1 rates. The limiting factor at high rates, such as DS3, is the FIFO size. Jitter is caused by: 1) bunching caused by the beat rate between various isochronous ATM sources, and/or 2) statistical queuing delays caused by paths in an ATM switch that are momentarily interrupted by other traffic. Bunching typically results in less delay than statistical queuing; the bunching delay occurs regularly.

Figure 2:
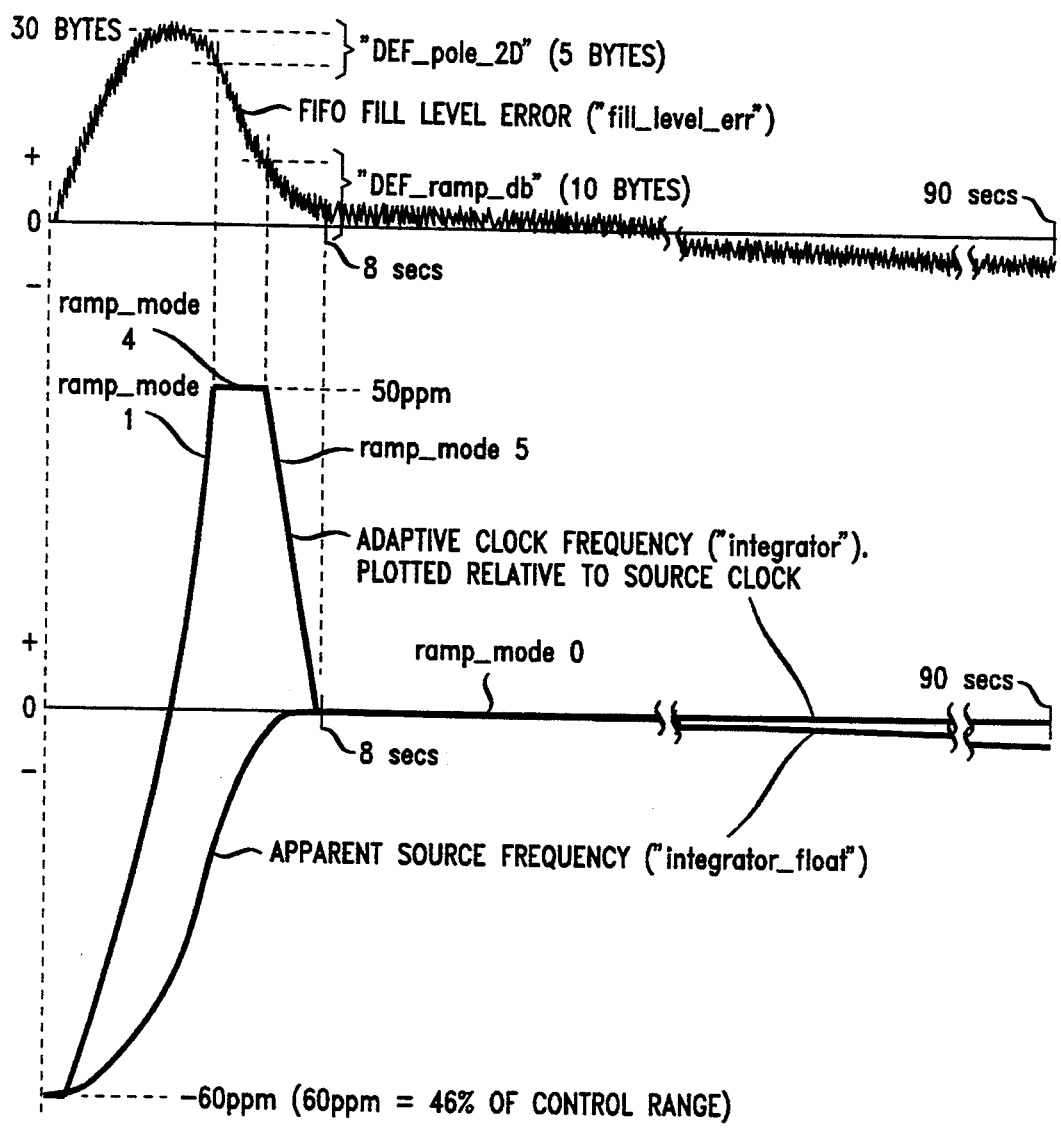
FIGS. 2 and 3 are response diagrams for the arrangement of FIG. 1.
Figure 3:
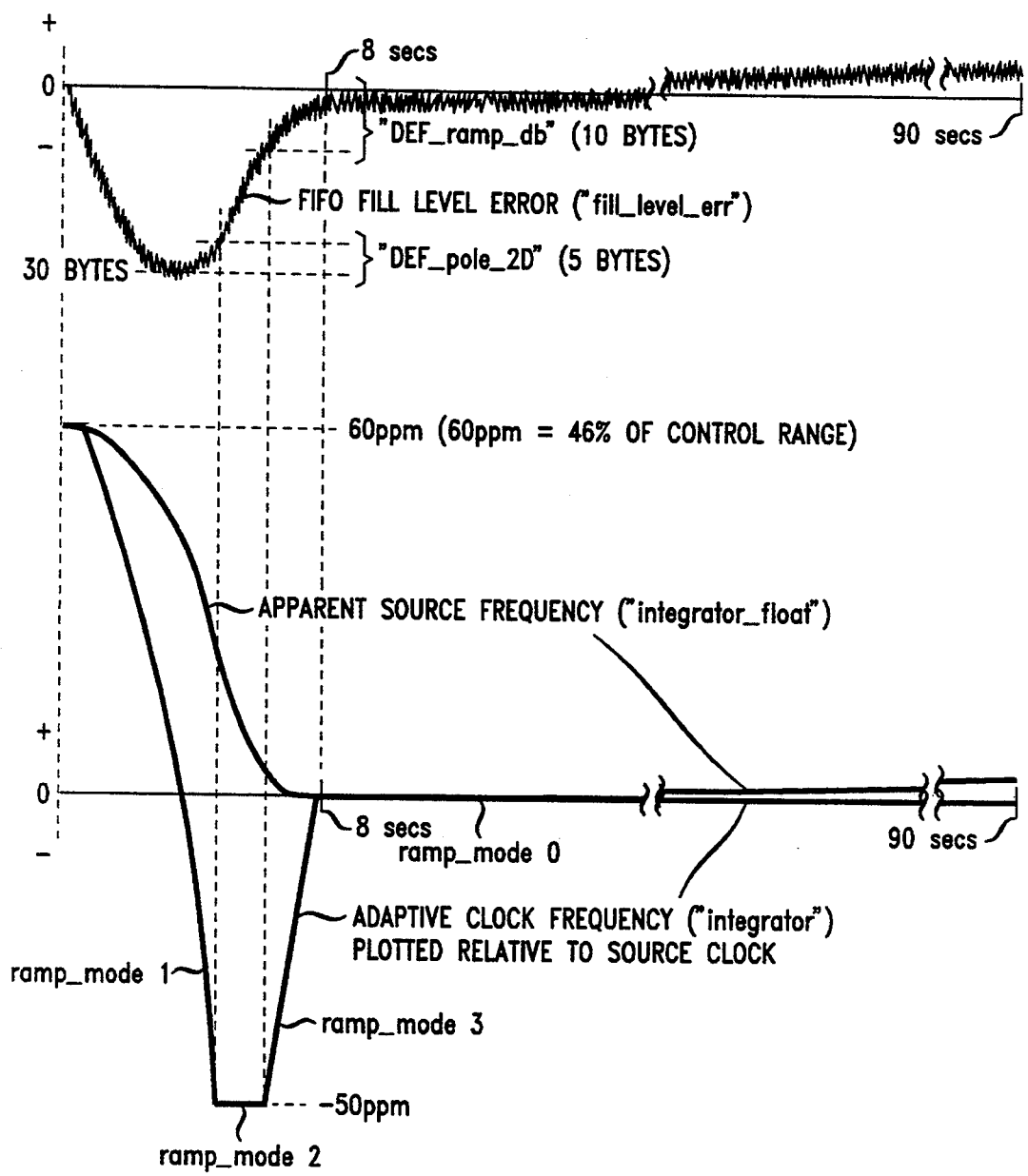

FIGS. 2 and 3 are response diagrams used to aid understanding of the operation of arrangement 10. In FIGS. 2 and 3, three program variables ("fill_level_err", "integrator", and "integrator_float") are plotted over a 90 second time interval. The variable "fill_level_err" represents the deviation in the magnitude of information stored in FIFO from a nominal value. For FIG. 2, the initial condition is that the adaptive clock frequency ("integrator") is 60 ppm slower than the source clock. The number of bytes stored in FIFO 15 increases therefore above the nominal value up to a maximum of 30 bytes (a FIFO overfill condition). As the number of bytes in FIFO 15 begins to increase, arrangement 10 is placed in ramp_mode 1 and the adaptive clock frequency ("integrator") is increased (overcorrected) up to a point 50 ppm over the source clock. When the FIFO fill level error ("fill_level_err") has increased to 30 bytes and then decreased a defined amount. ("DEF_pole_2D"=5 bytes), arrangement 10 is placed in ramp_mode 4 and the adaptive clock frequency ("integrator") is held constant at 50 ppm over the source clock to give FIFO 15 time to clear out some of the +30 bytes. When the FIFO fill level error ("fill_level_err") has decreased to a predetermined threshold (DEF_ramp_db"=10 bytes), arrangement 10 is placed in ramp-mode 5 and the adaptive clock frequency ("integrator") is reduced linearly (at a rate proportional to the amount of overcorrection that was needed) to a value which equals the apparent source frequency ("integrator_float") and arrangement 10 is then placed in ramp_mode 0. The rapid linear reduction results in a reduced length correction cycle. The reduction of the adaptive clock frequency ("integrator") to zero occurs just less than 8 seconds from the plot origin. (The program includes further defensive checks which will stop the reduction of adaptive clock frequency ("integrator") if the apparent source frequency ("integrator_float") is not reliably estimated.) Note that there is no further oscillation—this is referred to as perfect deadbeat damping. The plots of "fill_level_err" and "integrator_float" both decrease gradually over time (FIG. 2 shows a total of 90 seconds). In ramp_mode 0, the program includes very slow corrections which can correct the FIFO fill level error by several bytes over 1.0-1.5 minutes such that the adaptive clock frequency ("integrator") will exactly equal the source frequency.

In FIG. 3, the initial condition is that the adaptive clock frequency ("integrator") is 60 ppm faster than the source clock. The number of bytes stored in FIFO 15 decreases therefore below the nominal value by up to 30 bytes (a FIFO underfill condition). As the number of bytes in FIFO 15 begins to decrease, arrangement 10 is placed in ramp_mode 1 and the adaptive clock frequency ("integrator") is decreased to a point 50 ppm under the source clock. When the FIFO fill level error ("fill_level_err") has decreased to −30 bytes and then increased a defined amount ("DEF_pole_2D"=5 bytes), arrangement 10 is placed in ramp_mode 2 and the adaptive clock frequency ("integrator") is held constant at 50 ppm below the source clock to give FIFO 15 time to store additional bytes. When the FIFO fill level error ("fill_level_err") has changed to a predetermined threshold ("DEF_ramp_db"=10 bytes) below the nominal value, arrangement 10 is placed in ramp_mode 3 and the adaptive clock frequency ("integrator") is increased linearly (at a a rate proportional the amount of overcorrection that was needed) to a value which equals the apparent source frequency ("integrator_float") and arrangement 10 is then placed in ramp_mode 0. The rapid linear increase results in a reduced length correction cycle. The increase of the adaptive clock frequency ("integrator") to zero occurs just less than 8 seconds from the plot origin. (The program includes further defensive checks which will stop the increase of adaptive clock frequency ("integrator") if the apparent source frequency ("integrator_float) is not reliably estimated.) Note that there is no further oscillation-perfect deadbeat damping. The plots of "fill_level_err" and "integrator_float" both increase gradually over time (FIG. 3 shows a total of 90 seconds). In ramp-mode 0, the program includes very slow corrections which can correct the FIFO fill level error by several bytes over 1.0-1.5 minutes such that the adaptive clock frequency ("integrator") will exactly equal the source frequency.

The nominal fill level of FIFO 15 is seven ATM cells or 7×47=329 bytes. The maximum number of ATM cells stored in FIFO 15 is 60 cells or 60×47=2820 bytes. The nominal fill level is the minimum needed to deal with jitter and with deviations due to startup (initial clock capture) so that there is minimum delay. Apparent source frequency ("integrator_float) is estimated by using a weighted combination of adaptive clock frequency ("integrator") and the FIFO fill level error ("fill_level_err"). The estimation is done primarily to control damping of the adaptive clock frequency ("integrator"). Note that the apparent source frequency ("integrator_float") varies more slowly than the adaptive clock frequency ("integrator"). This is partially based on the assumption that the source clock frequency varies only very gradually. Adaptive clock frequency ("integrator") is used to correct FIFO deviations which result from: 1) mismatch with source frequency, and 2) a gain or loss of data in the ATM network. FIFO fill level error ("fill_level_err" ) responds in consort with adaptive clock frequency ("integrator").

The adaptive clock recovery method is a digital signal processing program that executes in microprocessor 29 (FIG. 1) and controls variable crystal oscillator (VCXO) 30. The program executes at a 1Khz sample frequency. The adaptive clock provides the functions of a "conventional" PLL but with input signal conditions that cannot be accurately tracked by a "conventional" PLL. In the adaptive clock recovery arrangement 10, the FIFO 15 fill-level provides the input to the program. The exact source clock rate can be determined from a bursty data stream if enough integration can be applied (a low-pass filter on the order of 1 HZ). The low-pass filter can easily be achieved by digital integration. The filter/integration period is determined by input jitter, lock-up time and clock jitter and wander requirements.

The challenge in implementing adaptive clocking is to achieve the narrow-band filter with good damping and stability. The "conventional" PLL has a very large phase/time lag between clock correction and detected response. The FIFO acts like a spring in the circuit, delaying the correction feedback. Jitter in the FIFO does not allow recognition of small corrections. The long time-constant integration filter compounds this loop delay problem. Also, unlike "conventional" PLLs, the FIFO 15 of arrangement 10 remembers past clock errors and lost data. These past conditions must be corrected by overcorrection of the clock swing, to normalize the; FIFO. In this type of application, "conventional" PLL lead/lag damping filters are not effective.

The algorithms of the present exemplary embodiment were developed for adaptive clocking and solve the above mentioned loop damping and stability problems. First, three input signals are determined. These are the apparent source frequency, the FIFO fill level error and the error direction (increasing/decreasing). A correction is then computed for the present clock frequency error and FIFO-level condition. This correction is executed as an open-loop, proportional ramp-up and ramp-down VCXO 33 control signal. Correction rate (ramp slope), amplitude and time are calculated to correct the error without continuous feedback from the FIFO level error; this is referred to as open-loop adjustment. (Ramp_modes 1, 2, 3, 4, and 5 correspond to open-loop adjustments.) At the end of the correction cycle, the FIFO level and clock are typically at their quiescent null points, even though the clock was overramped in the cycle. The overall damping response is deadbeat (zero undershoot or overshoot) when the error is accurately determined.

Integration is performed on the FIFO level error signal to provide additional filtering of data jitter. This integration time is an important parameter and determines part of the adaptive clock's damping response. Because adaptive clock ramp up/down control decisions are made on fuzzy FIFO-level error data, several heuristic checks and corrections are used to detect and prevent false clock ramp movements before the adaptive clock recovery arrangement 10 becomes out-of-lock.

Excellent clock stability, damping response and FIFO level control has been achieved, in simulations, for clock rates from 1.5 to 45 MHZ. Jitter is totally absent from the clock output.

The exemplary adaptive clock recovery method is useful for systems which must derive an accurate clock with very low jitter, solely from an input data stream with large jitter. The method is also useful for other systems which have a large lag in control response, coupled with noise in the signal input. The method can be scaled and tuned for a wide range of applications.

Figure 4:
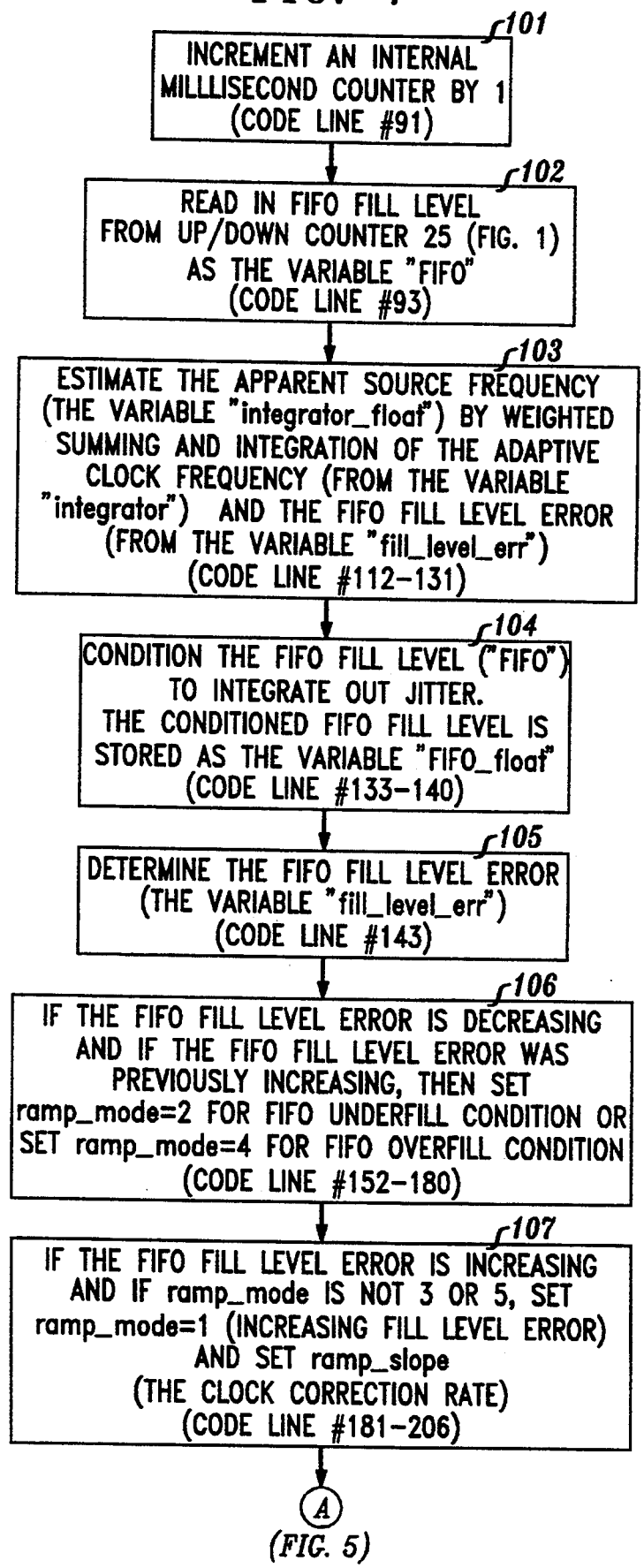
FIGS. 4-6 are software flow charts for a program executed by a microprocessor included in the arrangement of FIG. 1.
Figure 5:
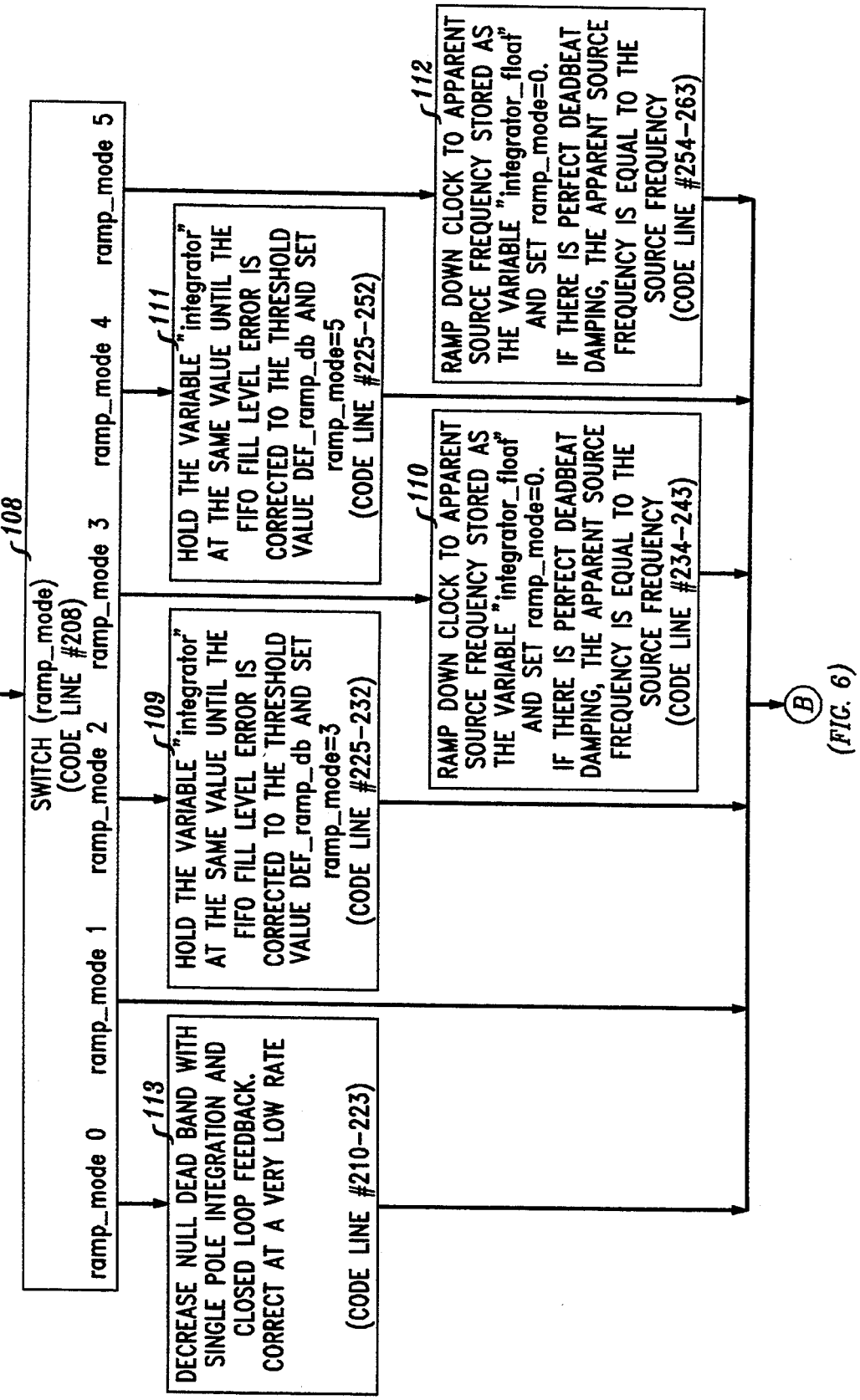
Figure 6:
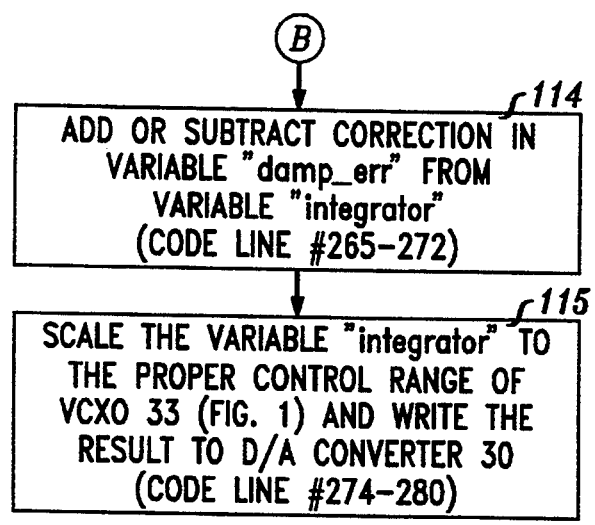

Software flow diagrams for the adaptive clock program executed by microprocessor 29 are shown in FIGS. 4-6 and the program functions and algorithms are described herein. Note that the blocks of FIGS. 4-6 reference particular lines of the program text which is included herein.

The adaptive clock program is executed at 1 millisecond intervals. This rate was chosen to provide a smooth, 4096-step control of the VCXO, thereby approximating an analog control circuit. The program can be operated with an average execution interval ranging from 0.9 to 1.1 milliseconds and is not sensitive to jitter variations from this rate. It is important to understand that the flow diagrams of FIGS. 4-6 and the corresponding description herein describe the operation of the program over a period of time; they describe more than a single program execution.

The variable "clk_tic" (FIG. 4, block 101) is a 32-bit counter that is incremented at each execution interval. It serves as a timer throughout the program. Events and processing algorithms are triggered by matching on a binary roll-over of timer masks, which are specified in a tuning parameter. For example, a 1 second event timer is implemented with a binary mask parameter of 1024-1 which gives a period of 1024, 1 ms clk tics.

The program has only one input (block 102), which is the number of bytes in the external elastic store FIFO 15. The variable "FIFO" is loaded from a read of the external hardware up/down counter 25 containing the FIFO fill level. FIFO 15 must be large enough to absorb the worst case cell delays plus a margin for queuing during the clock capture time.

The first algorithm in the program flow (block 103) produces a value in variable "integrator_float" which always contains an estimated baseline frequency, or apparent source frequency, in terms of an integrator count. This algorithm could also have been placed and executed at the end of the program.

The baseline frequency should ideally equal the FIFO data arrival bit rate, which is the apparent source frequency. In the program's quiescent or in-lock state (ramp_mode 0), the value of "integrator_float" equals the variable "integrator". The "integrator" variable provides the main (pole 1 ) integration accumulator function and directly controls the VCXO 33 frequency. The value "integrator_float" is developed as a weighted and scaled combination of the values in "integrator and "fill_level_err". Refer to the program text for the exact logic. The variable "integrator_float" is another integration accumulator with about twice the integration time constant as the pole 1 variable "integrator". It reaches its final value at the end of an open loop correction cycle and should then equal the value in "integrator". Variable "integrator_float" does not respond to the faster changes of "integrator". The variable "integrator" responds faster to lead corrections for source frequency changes and to normalize the FIFO level from this or from data loss. The VCXO 33 clock, which is controlled by "integrator", is also overcorrected, for a period of time, to normalize FIFO 15 after a frequency change. Variable "integrator_float" is not over corrected, but arrives at its new baseline level just as the correction cycle is completing. The main FIFO and clock correction loop use "integrator_float" to determine where to return to (or ramp down to) after a FIFO level correction is made. This algorithm also returns "integrator_float" to the original baseline source frequency after clock changes are made only to normalize the FIFO level. This can be seen in FIG. 8. (Error conditions in other transmission circuits can cause data to be added or lost, with no change in the source clock frequency.)

The parameters that develop "integrator_float" are determined by plotting the response of "integrator", "integrator_float" and "fill_level_err" and adjusting them to obtain maximum damping (minimum or no under/overshoot) of both the fill_level_err and integrator (VCXO 33 frequency) variables. The value "integrator_float" reaches its new baseline value coincident with fill_level_err reaching zero. Plots showing this intersect are shown in FIGS. 2 and 3.

The algorithm of block 103 continually estimates the apparent source frequency so that the circuit can be returned back to the correct frequency after any open-loop clock or FIFO level adjustment is made. The algorithm is used as the primary control of damping factor for the overall circuit.

The next algorithm in the flow (block 104) performs a pre-integration or jitter smoothing operation. It filters out most of the data arrival (FIFO fill level) jitter that appears in variable "FIFO". The output of the algorithm is a new variable called "FIFO_float". "FIFO_float" tracks "FIFO" by one byte count in every time period defined by parameter "DEF_float_inertia_mask". For a DS1 rate clock implementation, this parameter is set at octal 37 which gives an event every 32 milliseconds. A maximum movement of one data byte in FIFO_float every 32 milliseconds equates to a DS1 clock change of 162 ppm/second. In this process, all jitter variations in excess of 162 ppm are smoothed out or ignored. This operation has no effect on the actual FIFO level, just on the apparent level processed by the rest of the program. The parameter must be set to a value that allows an apparent FIFO rate change that is greater than the maximum VCXO 33 slew rate, e.g., twice the slew rate.

The method of block 104 pre-filters data arrival jitter and tracks FIFO data level variations below a specified rate of change, in terms of ppm/second. The method eliminates the need for a front-end FIFO to smooth data arrival jitter.

The next significant program statement (block 105) initializes variable "fill level err" by subtracting parameter "DEF_normal_fill_level" from "FIFO float". Variable "fill level err" is a signed value of the FIFO level deviation from a predetermined nominal value. It is used as the loop error signal in the rest of the program. A positive value indicates that the FIFO level is increasing and the VCXO 33 must change to a higher frequency to normalize it.

The next algorithms (blocks 106 and 107) develop the main control states for the open-loop, calculated clock corrections.

The algorithm of block 106 determines if the fill level error is decreasing by comparing the current fill_level_err to a previous error condition in "old fill err". Hysteresis is incorporated into this detection by only responding to changes in the FIFO fill level that exceed the number of bytes specified in parameter DEF_pole-2D. This hysteresis reduces the number of false detections caused by data arrival jitter remaining in variable fill_level_err. The decreasing check (block 106) then determines the direction of the adaptive clock change. For a FIFO under fill condition, the clock will be at a lower frequency than the source (integrator value is below the center frequency point); for an overfill (positive) condition, the adaptive clock will be higher than the source (integrator above the center frequency). If the fill level error was decreasing in the previous execution interval, no action is taken except to update "old_fill_err" to the current error in "fill_level_err". If however, the previous state in "ramp_mode" equals 1 (increasing mode), this event becomes an increasing-to-decreasing change.

The "increasing-to-decreasing" event is significant because it determines that the adaptive clock VCXO 33 has exceeded the "apparent" source clock frequency. This event is used to start ramp_modes 2 or 4, which will stop further (increasing) clock correction and hold the present frequency in "integrator". Variable "ramp_mode" is set to state 2 for an underfilled FIFO 15 and to state 4 for an overfilled FIFO 15. Variable "ramp_slope" is initialized to control the rate at which the clock is returned (ramped down) to the baseline. (Recall that the clock was overcorrected to normalize FIFO 15.) The ramp slope rate, stored in variables "ramp_slope" and "fill_err_dx", are calculated to be a fraction of the "fill_level_err" as determined by parameter "DEF_div_x". The, ramp down slope is proportional to the FIFO level error at the start of this event.

The method of block 106 indicates when the VCXO clock correction equals the apparent source frequency (data arrival rate). The method of block 106 also calculates the rate at which the clock is returned or ramped down (ramp_slope) to the baseline frequency, to reach the baseline at a time when the FIFO fill error will also reach zero.

After the fill error decreasing check is done, the program falls through to a fill error increasing check (block 107). The increasing direction is determined by comparing old_fill_err with the current fill error. This works like the decreasing check but with the old and new reversed. The difference between the old and new fill_level_err must exceed parameter DEF_pole2I for increasing checks. Further checks are made before responding to an increasing event. If the ramp_modes indicated a clock ramp_down (states 3 or 5), or the fill error is in the null (dead band) region, the increasing event is ignored. Passing these checks, the ramp_mode is set to 1 and the ramp_slope is set to value "fill_err_dx".

Parameter DEF_pole_2D controls the amount of adaptive clock overshoot, in addition to providing hysteresis for the increasing to decreasing check. A controlled amount of over-shoot (overcorrection) is used to normalize the FIFO 15 fill level after the source clock rate is meet. Values are determined by plotting the response and adjusting for an approximate 75 percent clock overshoot (75% overcorrection of the initial difference between the source and adaptive clock frequencies). The amount of overshoot determines the time that it takes to normalize the FIFO 15.

The method of blocks 106 and 107 reliably determines if the FIFO 15 level error is increasing or decreasing in the presence of high data arrival jitter. The method of block 106 also controls the amount of clock over-correction needed to normalize the FIFO fill level.

Once in the increasing fill error mode (ramp_mode 1), the correction in ramp_slope is added to the present value of "integrator" each time interval. Note that ramp_slope can contain either a positive or negative value because the needed clock correction could be either to a higher or lower frequency (FIG. 6, block 114). This algebraic addition ramps the integrator, which drives the VCXO 33 frequency to a value that meets and then exceeds the source frequency. When the apparent source frequency is exceeded, the FIFO fill level error starts to decrease. The ramp_slope rate does not taper off as the error decreases, as in most continuous-feedback closed-loop systems. This method minimizes error convergence time. Overshoot is controlled by the operation of ramp_modes 2-5.

The method of block 114 (FIG. 6) performs the main (pole 1) integration function.

Block 108 (FIG. 5) is the switch (ramp_mode) statement at code line #208. Clock ramp modes provide the hold, over-correction, and ramp down functions. Mode 2 (case 2 in the switch statement) is a hold for negative fill level errors. It invokes mode 3 for the ramp down. Mode 4 is the hold for positive fill level errors and the corresponding ramp down is mode 5. Ramp_modes 2 and 4 are: requested by the decreasing fill error check algorithm (block 106). At the start of the decreasing event (increasing error turns to decreasing), the adaptive clock VCXO 33 met then exceeded (overshot) the source clock rate by a controlled amount. The FIFO 15 fill level will be off its nominal value, at the start, because it gained or lost data during the increasing error mode interval when clock rates were converging. Ramp modes 2 and 4, (blocks 109 and 111, respectively, in FIG. 5) allow the clock overshoot condition to be held constant until the FIFO 15 fill level converges toward the nominal value and meets a threshold defined in parameter DEF_ramp_db. This parameter is set to a FIFO level correction point that allows time for the adaptive clock integrator to be ramped down to meet the baseline (source) frequency just when the fill_level_err reaches zero. When parameters are set correctly, the result is a dead-beat response (little or no clock overshoot or undershoot), which is not typical for a "conventional" phase locked loop. This can generally be achieved for a wide range of initial frequency differences between the source and the adaptive clock VCXO 33.

The ramp_down "ramp_modes" are ramp_mode 3 (block 110) and ramp_mode 5 (block 112) as shown in FIG. 5. When ramp_modes 3 and 5 complete the ramp_down to the baseline integrator value in "integrator_float", they set the ramp_mode to 0 and break from the switch statement. Ramp_mode 0 is the quiescent state for the open loop control algorithm (ramp_modes 1-5). If there is perfect dead-beat damping, the adaptive frequency will match the source and the FIFO will be at the nominal level. If the remaining null error is greater than parameter DEF_dead_band, a new sequence is started by the increasing-error detection algorithm (block 107). More than one cycle is required during circuit start-up, when the clocks are different and the FIFO fill level is off nominal. This can be seen in the secondary correction cycles at 40 seconds in FIG. 9.

The method of blocks 109 and 111 hold an over corrected adaptive clock state until the FIFO level is adjusted. The method of blocks 110 and 112 ramp down the adaptive clock to meet the source frequency when the FIFO fill error approaches zero.

Ramp_mode 0, which is the quiescent state, is entered when the fill level err is in a small dead-band range. Parameter DEF_dead_band defines the dead band for ramp_modes 1-5. It is set to eight for a DS1 rate application which allows a null range of +/−8 bytes. Ramp_mode 0 (block 113) adds a direct (closed-loop) feedback correction to the integrator. It adds or subtracts one at the rate specified by the parameter DEF_case0_rate. The correction rate is very low and this loop has a natural frequency of about 1/60 HZ. The loop oscillates at the natural loop frequency with the fill_level_err usually not deviating more than +/−2 bytes in the short term and zero bytes average in 60 seconds. It should be noted that adaptive clock frequency tracking/wander error is related to the FIFO fill level error at null.

The method of block 103 (FIG. 4) adds in a very small amount of closed loop feedback, at the null point, to decreases the FIFO fill_level null error to zero, within one cycle of its loop frequency.

The last function in the adaptive clock program is writing the contents of the variable "integrator" to the D/A converter 30, which controls the VCXO 33 frequency (FIG. 6, block 115). This function scales the 16 bit variable "integrator" to the control range specified in the parameter DEF_VCXO_range_factor, and then offsets the scaled value to the VCXO 33 center frequency point, which is specified in the parameter DS 1_VCXO_DAC_center. This scaled and centered value is written to the D/A converter 30 address and the adaptive program returns to the calling program or interrupt level.

The adaptive clock techniques and algorithms are useful for systems which must derive an accurate clock with very low jitter, solely from an input data stream with large jitter. It is also useful for systems which have a large lag in control response, coupled with noise in the signal input. It can be scaled and tuned for a wide range of applications.

The program described in this embodiment was optimized for execution speed in small embedded processors. A 16 bit processor of about 1 MIP capacity can process four adaptive clock circuits in parallel. Multiply operations are not used and many of the algorithms produce approximations instead of precision calculations. However, calculations can be added to minimize tuning set-up and improve damping to reach a dead-beat response under a wider range of operational conditions. The program listing follows.

```
1
2
3
4
5
6
7
8
9
10
11
12
13
14
15
16
17
18
19
20
21
22
```

```
23
24
25
26
27
28
29
30   /* t1_adc.c source file */
31
32 1 {
33 1
34 1 /* local DEFinitions arranged as variables for tuning */
35 1
36 1 /* Tuning Notes : DS1
37 1 Pole2I = 6 for low jitter, 8 for moderate cell jitter
38 1 Pole2D = 4 for low jitter, 6 for moderate jitter
39 1 dead_band = 2 for low to moderate jitter, 8 for high jitter >> must be pwr of 2
40 1 case0_db = 0-2 for low to moderate jitter, try 2-4 for high jitter
41 1 case0_rate = none or 0177, use 037 for more null control
42 1
43 1 The remaining variables are for large transient or offset response
44 1 and should not require adjustment.
45 1 */
46 1
47 1 /* The VCXO must be set to +/- 130 ppm for DS1 -- or -- use following factor */
48 1 /* VCXO range factor = (16 * (
                              actual VCXO range divided by 130 for DS1 and /40 for DS3).
49 1
50 1 #define  DS1_VCXO_DAC_center  1900
51 1 #define  DS1_integrator_center  (DS1_VCXO_DAC_center * 16)
52 1
53 1 static short DEF_VCXO_range_factor = 22;        /* DS1 = (16 * (180/130)) = 22 */
54 1 static short DEF_VCXO_DAC_center  = DS1_VCXO_DAC_center;
55 1 static short DEF_integrator_center = DS1_integrator_center;
56 1 static short DEF_normal_fill_level = LAM_FIFO_NORMAL_LEVEL_DS1;
57 1 static short DEF_pole2D     = 5;                /* pole 2 integration (dec err diff.
58 1 static short DEF_pole2I     = 7;                /* pole 2 integration (inc err diff.
59 1 static short DEF_min_dec_rate = 2;              /* low-end dec rate boost */
60 1 static short DEF_div_x      = 8;                /* divide by x  for fill_level_err
61 1 static short DEF_dead_band  = 8;                /* large response dead-band */
62 1 static short DEF_ramp_db    = 10;               /* ramp-down threshold */
63 1 static short DEF_float_inerita_mask = 037;      /* 037 (octal) = 162 ppm/sec  */
64 1 static short DEF_integ_float_rate   = 03;       /* 03 = 250/sec -- DS1 value */
65 1 static short DEF_integ_adj_ratio    = 4096;
66 1 static short DEF_fill_adj_ratio     = 8;
67 1 static short DEF_adj_lim            = 3;
68 1 static short DEF_case0_rate         = 07;
69 1 static short DEF_case0_db           = 1;        /* null dead-band */
70 1
71 1 /* local static variables */
72 1 static long old_fill_err;
73 1 static long damp_err;
74 1 static long fill_level_err;
75 1 static long fill_err_unf;
76 1 static long integrator = DS1_integrator_center;
77 1 static long integrator_float = DS1_integrator_center;
78 1 static long scaled_integrator;
79 1 static long clk_tic;
80 1 static long ramp_mode;
81 1 static long ramp_slope;
82 1 static long fill_err_dx;
83 1 static long integ_float_adj;
84 1 static long fill_adj;
85 1 static long FIFO;
86 1 static long FIFO_float;
87 1 static u_short dac_loc;
88 1 static long dead_band;
89 1
90 1
91 1 clk_tic = clk_tic + 1;
92 1
93 1 FIFO = *ptr_FIFO_level;         /* Read FIFO level register - qty in bytes */
94 1
95 1 /******** Adaptive clk initialization ***********/
```

```
 96  1 if (adclk_ckt_init == TRUE)
 97  2    {
 98  2            adclk_ckt_init = FALSE;
 99  2
100  2            integrator = DEF_integrator_center;
101  2            integrator_float = integrator;
102  2            damp_err = 0;
103  2            ramp_mode = 0;
104  2            clk_tic = 0;
105  2            old_fill_err = 0;
106  2            fill_level_err = 0;
107  2            FIFO_float = FIFO;
108  1    }
109  1
110  1 /*********** Start of adaptive clock algorithm *****************/
111  1
112  1 /* the rate of integrator_float change must NOT exceed the integrator ramp rate */
113  1 if ( (clk_tic & DEF_integ_float_rate) == 0)      /* rate of change of integrator_flo<
114  2 {
115  2 integ_float_adj = (integrator - integrator_float) / DEF_integ_adj_ratio;
116  2 fill_adj = fill_level_err / DEF_fill_adj_ratio;
117  2
118  2 if (integ_float_adj > DEF_adj_lim)
119  2         integ_float_adj = DEF_adj_lim;
120  2
121  2 if (integ_float_adj < -DEF_adj_lim)
122  2         integ_float_adj = -DEF_adj_lim;
123  2
124  2 if (fill_adj > DEF_adj_lim)
125  2         fill_adj = DEF_adj_lim;
126  2
127  2 if (fill_adj < -DEF_adj_lim)
128  2         fill_adj = -DEF_adj_lim;
129  2
130  2 integrator_float = integrator_float + integ_float_adj + fill_adj;
131  1 }
132  1
133  1 if ((clk_tic & DEF_float_inerita_mask) == 0)
134  2 {
135  2 if (FIFO > FIFO_float)
136  2         FIFO_float = FIFO_float + 1;
137  2
138  2 if (FIFO < FIFO_float)
139  2         FIFO_float = FIFO_float - 1;
140  1 }
141  1
142  1
143  1 fill_level_err = FIFO_float - DEF_normal_fill_level;
144  1 fill_err_unf = FIFO - DEF_normal_fill_level;
145  1
146  1 *ptr_DAC_3 = (u_short)(fill_level_err + 2048);         /* output for test access *,
147  1
148  1 fill_err_dx = fill_level_err / DEF_div_x;
149  1 dead_band = fill_level_err / DEF_dead_band;
150  1
151  1
152  1 /* decreasing error */
153  1 if ((fill_level_err < 0) && (fill_level_err - old_fill_err >= DEF_pole2D))
154  2 {
155  2
156  2         old_fill_err = fill_level_err;
157  2
158  2 /* Increasing turns to decreasing */
159  2         if (ramp_mode == 1)
160  3         {
161  3         ramp_mode = 2;
162  3         ramp_slope = fill_err_dx - DEF_min_dec_rate;   /* low-end dec rate boost *,
163  2         }
164  2
165  1 }
166  1
167  1
168  1 if ((fill_level_err > 0) && (old_fill_err - fill_level_err >= DEF_pole2D))
169  2 {
```

```
170  2
171  2          old_fill_err = fill_level_err;
172  2
173  2  /* Increasing turns to decreasing */
174  2          if (ramp_mode == 1)
175  3          {
176  3          ramp_mode = 4;
177  3          ramp_slope = fill_err_dx + DEF_min_dec_rate;    /* low-end dec rate boost *,
178  2          }
179  2
180  1  }
181  1
182  1  /* increasing error */
183  1  if ((fill_level_err < 0) && (old_fill_err - fill_level_err >= DEF_pole2I))
184  2  {
185  2
186  2          old_fill_err = fill_level_err;
187  2
188  2          if ((ramp_mode != 3) && (ramp_mode != 5) && (dead_band != 0))
189  3          {
190  3          damp_err = fill_err_dx;
191  3          ramp_mode = 1;
192  2          }
193  1  }
194  1
195  1
196  1  if ((fill_level_err > 0) && (fill_level_err - old_fill_err >= DEF_pole2I))
197  2  {
198  2
199  2          old_fill_err = fill_level_err;
200  2
201  2          if ((ramp_mode != 3) && (ramp_mode != 5) && (dead_band != 0))
202  3          {
203  3          damp_err = fill_err_dx;
204  3          ramp_mode = 1;
205  2          }
206  1  }
207  1
208  1  switch (ramp_mode)
209  2  {
210  2  case 0:
211  2  case 1:
212  2
213  2  if ( (clk_tic & DEF_case0_rate) == 0)
214  3  {
215  3
216  3  if (fill_err_unf > DEF_case0_db)
217  3  integrator = integrator + 1;
218  3
219  3  if (fill_err_unf < -DEF_case0_db)
220  3  integrator = integrator - 1;
221  2  }
222  2
223  2  break;
224  2
225  2  case 2:
226  2          damp_err = 0;
227  2
228  2          if (fill_level_err > -DEF_ramp_db)
229  3          {
230  3                  ramp_mode = 3;
231  2          }
232  2  break;
233  2
234  2  case 3:
235  2          damp_err = -ramp_slope;
236  2
237  2          if ((integrator > integrator_float) || (fill_level_err > DEF_ramp_db))
238  3          {
239  3                  ramp_mode = 0;
240  3                  damp_err = 0;
241  3                  old_fill_err = fill_level_err;
242  2          }
243  2  break;
244  2
```

```
245  2       case 4:
246  2               damp_err = 0;
247  2
248  2               if (fill_level_err < DEF_ramp_db)
249  3               {
250  3                       ramp_mode = 5;
251  2               }
252  2       break;
253  2
254  2       case 5:
255  2               damp_err = -ramp_slope;
256  2
257  2               if ((integrator < integrator_float) || (fill_level_err < -DEF_ramp_db))
258  3               {
259  3                       ramp_mode = 0;
260  3                       damp_err = 0;
261  3                       old_fill_err = fill_level_err;
262  2               }
263  2       break;
264  1       }
265  1
266  1       integrator = integrator + damp_err;
267  1
268  1       if (integrator < 0)
269  1               integrator = 0;
270  1
271  1       else if (integrator > 0xFFF0)           /* avoid rollover to 0 */
272  1               integrator = 0xFFF0;            /* masking will not work here */
273  1
274  1       /* normalize and scale >> the 16 bit integrator to 12 bits << and */
275  1       /* scale the >> DAC value << (
                                            both scales are included in the VCXO_ranger_factor value
276  1       scaled_integrator = (integrator - DEF_integrator_center) / DEF_VCXO_range_factor;
277  1
278  1       dac_loc = (u_short)(scaled_integrator + DEF_VCXO_DAC_center);
                                                         /* add it DAC center or nul.
279  1
280  1       *ptr_DAC = *ptr_DAC_global = dac_loc;                /* write to DAC for ckt. x
281  1
282          }
283          /************* End of adaptive clock algorithm *****************/
```

Figure 7:
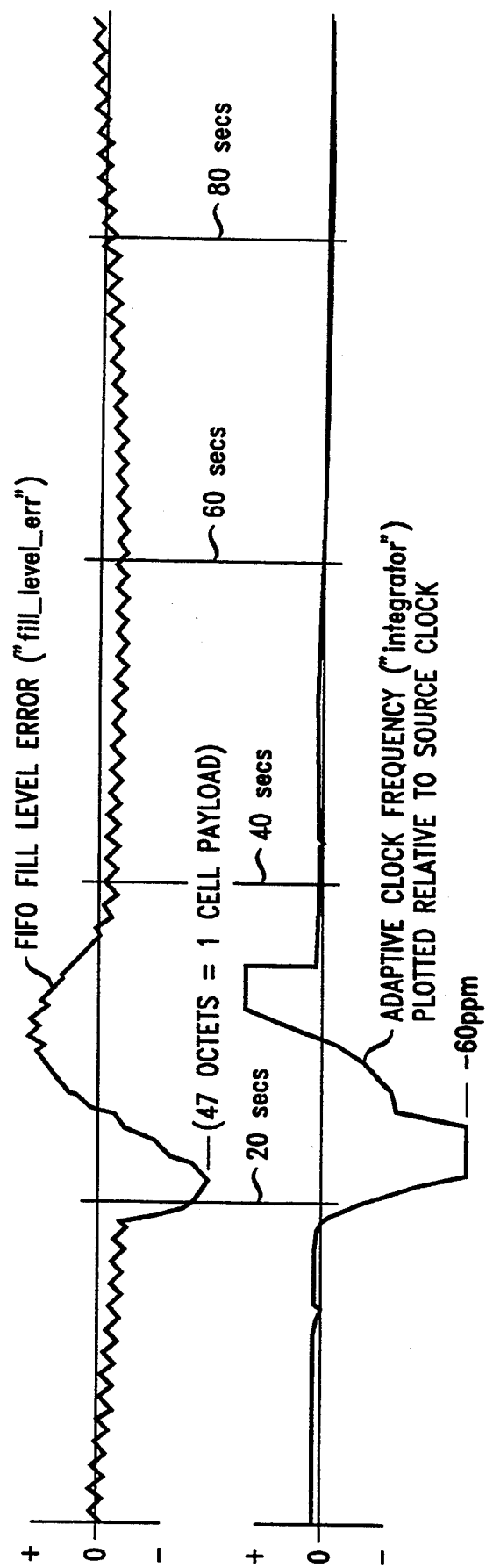
FIGS. 7-9 are additional response diagrams for the arrangement of FIG. 1.

FIG. 7 is a response diagram showing the adaptive clock frequency ("integrator", plotted relative to the source clock), and the FIFO fill level error ("fill_level_err"). The diagram shows the response of arrangement 10 (FIG. 1) to a transient error condition where FIFO 15 loses one cell payload (47 bytes or octets). The fill_level_err trace shows the transient cell loss and the adaptive clock response to it by going 60 ppm less than the source. Notice that there is a half cycle over-shoot or damping settle time. This is characteristic of arrangement 10 for transient data loss/gain. Arrangement 10 has been optimized to provide better damping for tracking source clock changes than for transient data errors.

Figure 8:
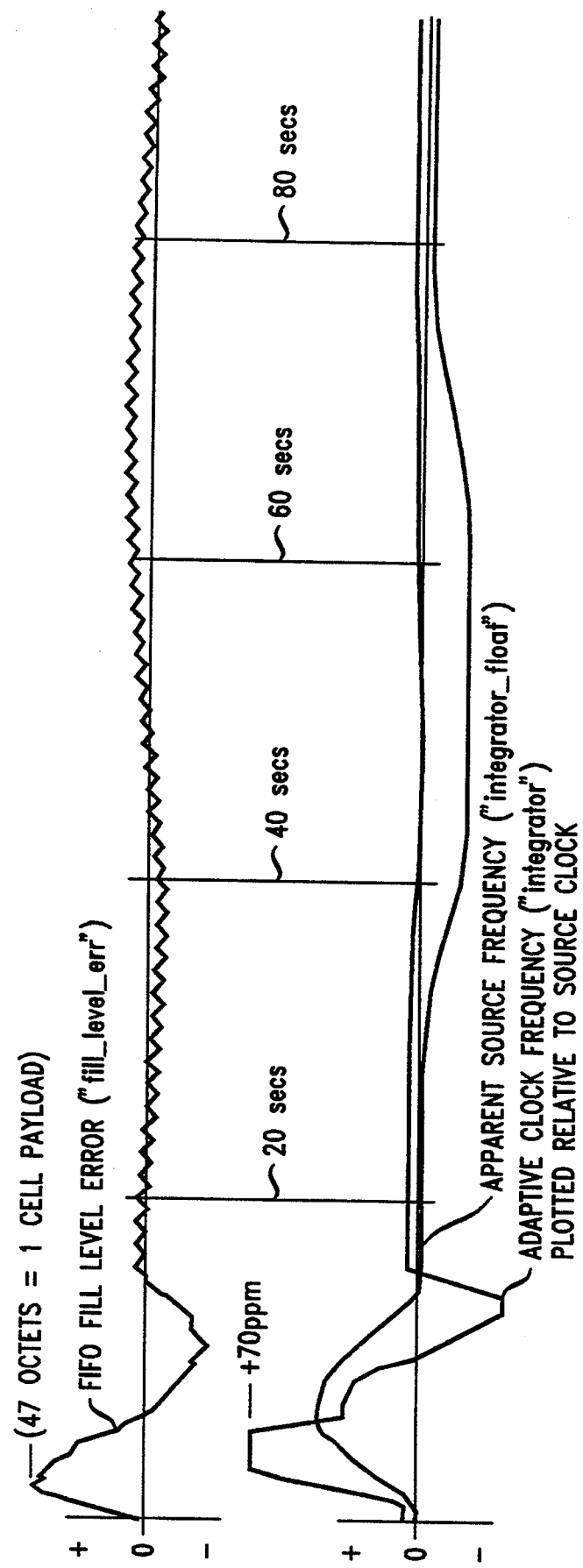

FIG. 8 is a response diagram showing the adaptive clock frequency ("integrator", plotted relative to the source clock), the FIFO fill level error ("fill_level_err"), and the apparent source frequency ("integrator_float"). The diagram shows the response of arrangement 10 to an initial FIFO 15 error of one cell payload (47 octets) with no initial source clock error. FIG. 8 is similar to FIG. 7 except that the cell loss event in FIG. 7 is a startup fill_level_err in this plot. Additionally, the integrator_float variable is included in this plot. The startup or clock capture interval can be significantly reduced by initializing the FIFO level to DEF_normal_fill_level at startup, before the adaptive clock algorithms are activated. This is also done by the processor 29 with the following procedure. When the circuit is inactive, the read_strobe 24 is disabled and the line xmtr 21 is set to transmit an idle code of all ones (DS1 AIS signal). When cell arrivals are detected and steady, the FIFO is reset 26 and the fill level is immediately monitored (polled) in a tight loop. When the fill level reaches DEF_normal_fill_level minus a lead bias, the read_strobe is enabled and the AIS signal disabled. The lead bias allows time for the processor to enable the read strobe. It can be adjusted to make the enable coincident with the fill level reaching DEF_normal_fill_level.

Figure 9:
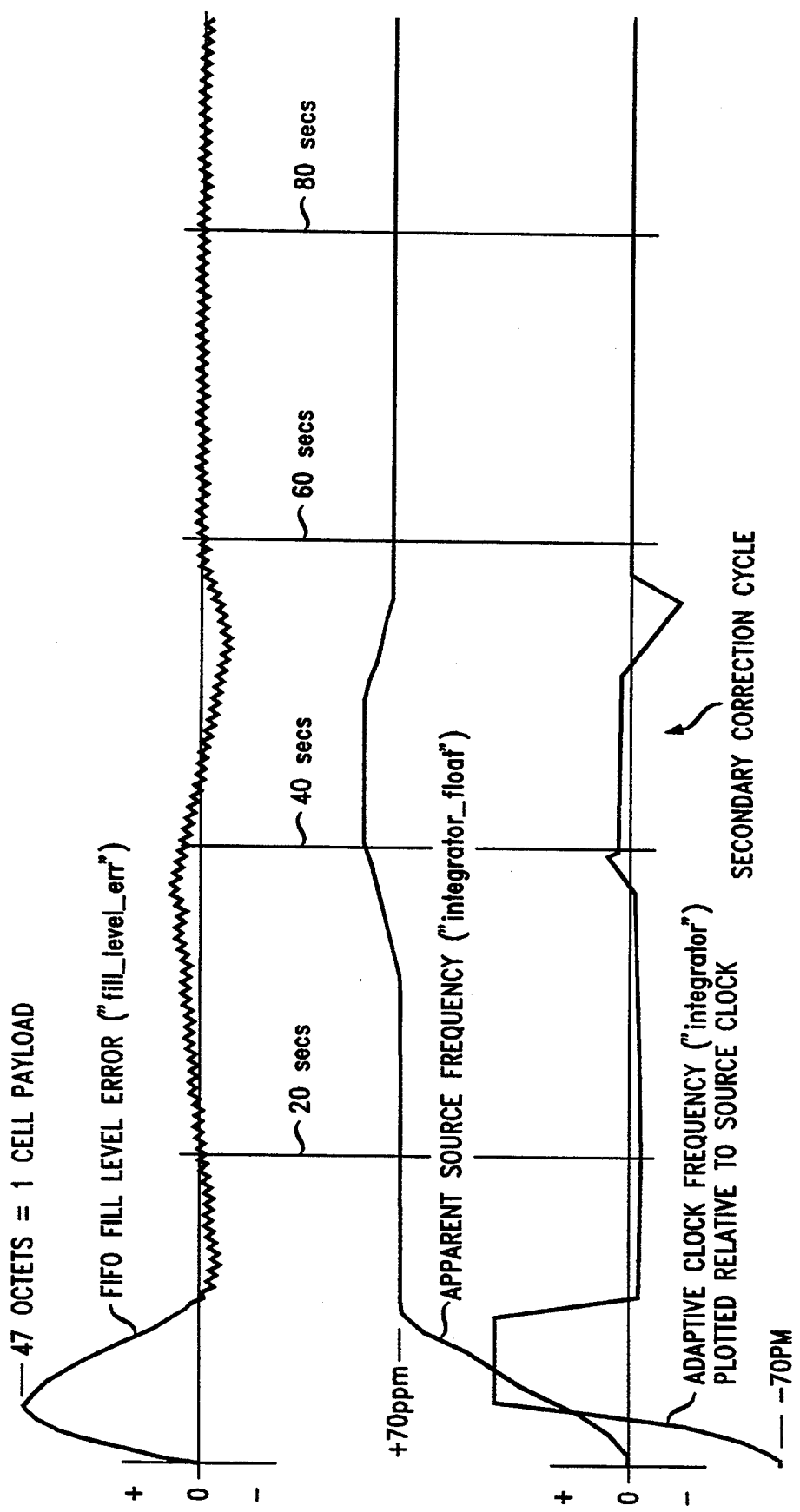

FIG. 9 is a response diagram showing the adaptive clock frequency ("integrator", plotted relative to the source clock), the FIFO fill level error ("fill_level_err"), and the apparent source frequency ("integrator_float"). The diagram shows the response to arrangement 10 to an initial FIFO 15 error of one cell payload (47 octets) and an initial source clock error of −70 ppm. FIG. 9 also shows a secondary correction cycle at 40 seconds. The initial correction cycle ramped down the clock to a few ppm less than the actual source frequency. This results in a slow upward drift of the fill_level_err and a correction cycle at 40 seconds. Ramp mode 0 also corrects for slow wander in the null zone and this can be seen by the adaptive clock integrator converging to near 0 at about 35 seconds. In this case, the ramp mode 0 correction was too little too late.

It is to be understood that the above-described embodiment is merely illustrative of the principles of the invention and that many variations may be devised by those skilled in the art without departing from the spirit and scope of the invention. It is therefore intended that such variations be included within the scope of the claims.

PRIOR ART—"CONVENTIONAL" PLL ARRANGEMENT

In a "conventional" PLL, the destination clock rate is determined solely from the average cell arrival rate. The phase/frequency information comes from the FIFO fill level as shown in FIG. 1 of the Bellcore contribution to T1S1.1—"A Clock Recovery Scheme for ATM Circuit Emulation", Richard C. Lau, Oct. 10, 1988. This technique is generally recognized as highly desirable because it does not require a network reference clock and encoded clock information from the source circuit. However, it is also generally recognized that, when actual designs are attempted, the performance is poor or unacceptable, in terms of clock convergence time, jitter and wander.

In addition to the above mentioned performance problems, circuit analysis and experimentation indicate that conventional PLLs in this application have inherent problems in the control of damping and stability when the phase/loop gain is sufficient to control clock wander.

Figure 10:
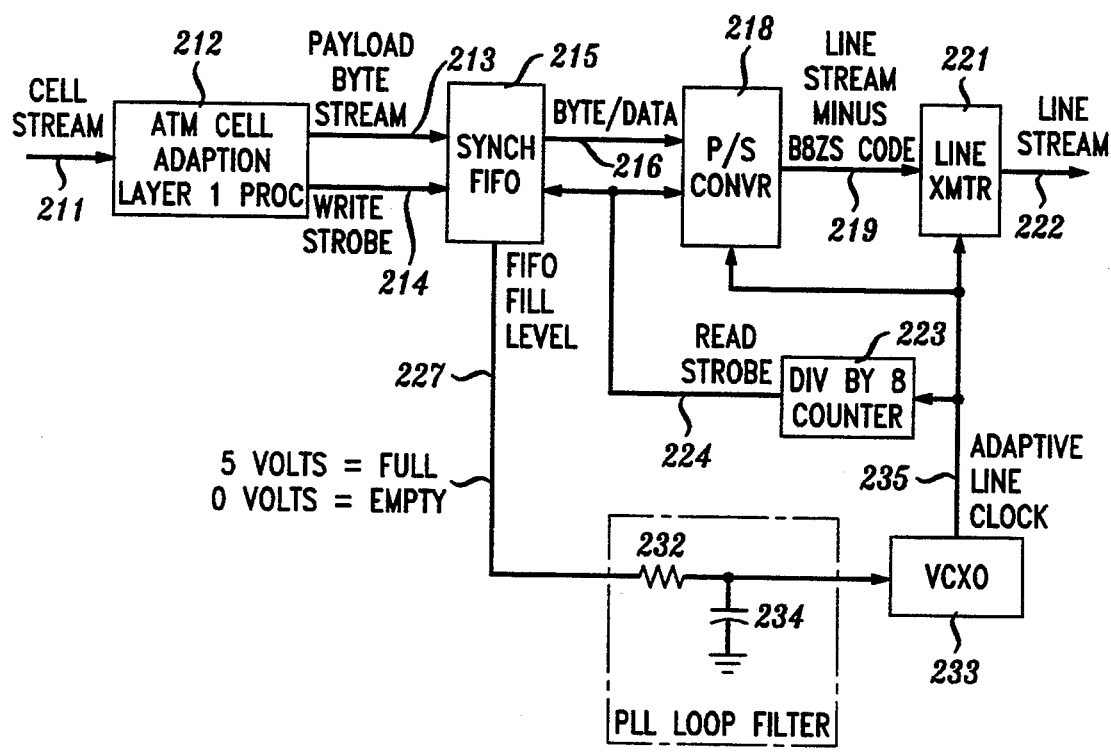
FIG. 10 is a circuit diagram of a prior art, "conventional" phase-locked-loop arrangement.

A specific example of a "conventional" PLL arrangement is shown as arrangement 210 in FIG. 10. Arrangement 210 is used at the interface from a 155 megabits per second, asynchronous transfer mode (ATM) cell stream on line 211, to a synchronous DS1, 1.544 megabits per second, constant bit rate circuit on line 222. Because of the bursty, asynchronous nature of the incoming cell stream on line 211, the clock needed to transmit information synchronously on line 222 is not derivable by using edge or transition information in the line 211 cell stream; rather it is based on the long term average cell rate on line 211. Each ATM cell on line 211 is a 53-byte packet including a five-byte header, one-byte adaption layer and a 47-byte payload of usable information. Circuit 212 performs CCITT adaption layer 1 processing, including removal of the cell header and adaption byte, and controls, using a write strobe on line 214, the writing of the 47-byte payload, via a byte bus 213, into a synchronous first-in-first-out (FIFO memory 215. FIFO 215 stores up to 4096, eight-bit bytes-more than adequate to store all the bytes that accumulate awaiting transmission of line 222. FIFO 215 also transmits an analog, FIFO fill level signal on line 227 which varies varies from 0 volts for an empty FIFO to 5 volts for a full FIFO.

The adaptive line clock on line 235 is used to control the transmission of bytes from FIFO 215 onto the DS 1, synchronous circuit on line 222. This adaptive line clock frequency on line 235 is used to operate a parallel/serial converter 218 and a line transmitter 221. The line clock frequency is divided by eight by a counter 223 and the resulting byte clock on line 224 is used as a read strobe, to effect the reading of a byte of payload information from FIFO 215 via byte bus 216, parallel/-serial converter 218, and line 219 for transmission by line transmitter 221 as a DS1 circuit on line 222. Transmitter 221 inserts a B8ZS code into the line stream to prevent more than seven consecutive zero bits from being transmitted on line 222.

The analog voltage on line 227 is transmitted through a PLL loop filter comprising resistor 232 and capacitor 234. The filtered voltage provides the control input signal to a voltage-controlled crystal oscillator (VCXO) 233 and the VCXO 233 adaptive line clock frequency on line 235 is adjusted in a closed-loop manner i.e., responsive to the analog voltage transmitted from FIFO 215 on line 227.

PRIOR ART—SYNCHRONOUS RESIDUAL TIME STAMP (SRTS) ARRANGEMENT

An SRTS arrangement has been standardized by CCITr Study Group, XVIII to reconstruct clock rates in ATM networks. In this arrangement, clock rate information is encoded at the source circuit, in the form of a time-stamp. The time-stamp is basically the difference between the source circuit clock and a network reference clock. This encoded time-stamp is transmitted to the destination clock circuit in reserved bits of the ATM cell header. At the destination clock circuit, the time stamp and the network reference clock are basically used to reconstruct the original source frequency. A diagram of this is shown in FIG. 5 from CCITT notes dated Mar. 9, 1992.

This method provides excellent performance of the destination clock circuit, meeting all transmission requirements. However, it can only be used when a network reference is available. Other drawbacks are the need for encoded information from the source and lack of control to adjust or maintain the FIFO fill level at the destination circuit. (The FIFO fill level affects the overall transmission delay in the circuit.)

I claim:

1. In an arrangement comprising
means for receiving asynchronous, packetized information,
means for storing said received information and
means for transmitting said stored information on a synchronous circuit in response to an adaptive line clock frequency,
a method comprising
continually monitoring the deviation in the magnitude of information stored in said storing means from a nominal value,
detecting an increasing condition of said monitored deviation and
in response to said detected increasing condition, adjusting said adaptive line clock frequency in a plurality of modes,
wherein said adjusting comprises in a first of said plurality of modes, overcorrecting said adaptive line clock frequency until after said monitored deviation begins to decrease; and
wherein said overcorrecting comprises:
overcorrecting said adaptive line clock frequency with a ramp control signal but without continually adjusting said adaptive line clock frequency based on said monitored deviation.

2. A method in accordance with claim 1 wherein said adjusting further comprises
in a second of said plurality of modes and after said overcorrecting, holding said adaptive line clock frequency constant until said monitored deviation has decreased to a predetermined threshold.

3. A method in accordance with claim 2 wherein said holding comprises
holding said adaptive line clock frequency constant without continually adjusting said adaptive line clock frequency based on said monitored deviation.

4. A method in accordance with claim 2 further comprising
continually determining an apparent source frequency, and wherein said adjusting further comprises
in a third of said plurality of modes, changing said adaptive line clock frequency until said adaptive line clock frequency is equal to said apparent source frequency.

5. A method in accordance with claim 4 wherein said overcorrecting comprises:
overcorrecting said adaptive line clock frequency with a ramp control signal but without continually adjusting said adaptive line clock frequency based on said monitored deviation.

6. A method in accordance with claim 1 further comprising
integrating said monitored deviation to filter out data jitter.

7. In an arrangement comprising:
means for receiving asynchronous transfer mode, packetized information,
means for storing said received information and
means for transmitting said stored information on a synchronous circuit in response to an adaptive line clock frequency,
a method comprising
continually monitoring the deviation in the magnitude of information stored in said storing means from a nominal value,
detecting an increasing condition of said monitored deviation and
in response to said detected increasing condition, adjusting said adaptive line clock frequency but without continually adjusting said adaptive line clock frequency in response to said monitored deviation.

8. In an arrangement comprising:
means for receiving asynchronous transfer mode, packetized information,
means for storing said received information and
means for transmitting said stored information on a synchronous circuit in response to an adaptive line clock frequency,
a method comprising
continually monitoring the deviation in the magnitude of information stored in said storing means from a nominal value,
continually determining an apparent source frequency,
detecting an increasing condition of said monitored deviation and
in response to said detected increasing condition, adjusting said adaptive line clock frequency based in part on said continually determined apparent source frequency.

9. A method in accordance with claim 8 wherein said continually determining comprises
continually determining said apparent source frequency based on said monitored deviation and said adaptive line clock frequency.

10. In an arrangement comprising:
means for receiving asynchronous transfer mode, packetized information,
means for storing said received information and
means for transmitting said stored information on a synchronous circuit in response to an adaptive line clock frequency,
a method comprising
continually monitoring the deviation in the magnitude of information stored in said storing means from a nominal value,
continually determining an apparent source frequency based on said monitored deviation and said adaptive line clock frequency for use in adjusting said adaptive line clock frequency.

11. In an arrangement comprising:
means for receiving asynchronous transfer mode, packetized information,
means for storing said received information and
means for transmitting said stored information on a synchronous circuit in response to an adaptive line clock frequency,
a method comprising
continually monitoring the deviation in the magnitude of information stored in said storing means from a nominal value,
detecting an increasing condition of said monitored deviation and
in response to said detected increasing condition, performing open-loop adjustment of said adaptive line clock frequency.

12. A method in accordance with claim 11 wherein said performing comprises
overcorrecting said adaptive line clock frequency until after said monitored deviation begins to increase.

13. A method in accordance with claim 12 wherein said performing further comprises
holding said adaptive line clock frequency constant until said monitored deviation has decreased to a predetermined threshold.

14. A method in accordance with claim 13 further comprising
continually determining an apparent source frequency, and wherein said performing further comprises
changing said adaptive line clock frequency until said adaptive line clock frequency is equal to said apparent source frequency.

15. A method in accordance with claim 14 further comprising
after said changing, performing closed loop correction of said adaptive line clock frequency.

16. Adaptive clock recovery apparatus comprising
means for receiving asynchronous, packetized information,
means for storing said received information,
means for transmitting said stored information on a synchronous circuit in response to an adaptive line clock frequency, and
processor means for (a) continually monitoring the deviation in the magnitude of information stored in said storing means from a nominal value, (b) detecting an increasing condition of said monitored deviation, and (c) in response to said detected increasing condition, adjusting said adaptive line clock frequency but without continually adjusting said adaptive line clock frequency in response to said monitored deviation.

17. Adaptive clock recovery apparatus comprising
means for receiving asynchronous, packetized information,
means for storing said received information,
means for transmitting said stored information on a synchronous circuit in response to an adaptive line clock frequency, and processor means for (a) continually monitoring the deviation in the magnitude of information stored in said storing means from a nominal value, (b) detecting an increasing condition of said monitored deviation, and (c) in response to said detected increasing condition, performing open-loop adjustment of said adaptive line frequency.

18. An interface between an ATM cell stream and a synchronous circuit line stream comprising
means for receiving said ATM cell stream,
means for extracting header information from said received ATM cell stream to obtain payload information,
means for storing said payload information,
means for serially transmitting said stored payload information on said synchronous circuit line stream in response to an adaptive line clock frequency, and
processor means for (a) continually monitoring the deviation in the magnitude of information stored in said storing means from a nominal value, (b) detecting an increasing condition of said monitored deviation, and (c) in response to said detected increasing condition, adjusting said adaptive line clock frequency in a plurality of modes.

19. An interface between an ATM cell stream and a synchronous circuit line stream comprising
means for receiving said ATM cell stream,
means for extracting header information from said received ATM cell stream to obtain payload information,
means for storing said payload information,
means for serially transmitting said stored payload information on said synchronous circuit line stream in response to an adaptive line clock frequency, and
processor means for (a) continually monitoring the deviation in the magnitude of information stored in said storing means from a nominal value, (b) detecting an increasing condition of said monitored deviation, and (c) in response to said detected increasing condition, adjusting said adaptive line clock frequency but without continually adjusting said adaptive line clock frequency in response to said monitored deviation.

20. An interface between an ATM cell stream and a synchronous circuit line stream comprising
means for receiving said ATM cell stream,
means for extracting header information from said received ATM cell stream to obtain payload information,
means for storing said payload information,
means for serially transmitting said stored payload information on said synchronous circuit line stream in response to an adaptive line clock frequency, and
processor means for (a) continually monitoring the deviation in the magnitude of information stored in said storing means from a nominal value, (b) continually determining an apparent source frequency, (c) detecting an increasing: condition of said monitored deviation, and (d) in response to said detected increasing condition, adjusting said adaptive line clock frequency based in pan on said continually determined apparent source frequency.

21. An interface between an ATM cell stream and a synchronous circuit line stream comprising
means for receiving said ATM cell stream,
means for extracting header information from said received ATM cell stream to obtain payload information,
means for storing said payload information,
means for serially transmitting said stored payload information on said synchronous circuit line stream in response to an adaptive line clock frequency, and
processor means for (a) continually monitoring the deviation in the magnitude of information stored in said storing means from a nominal value, and (b) continually determining an apparent source frequency based on said monitored deviation and said adaptive line clock frequency for use in adjusting said adaptive line clock frequency.

22. An interface between an ATM cell stream and a synchronous circuit line stream comprising
means for receiving said ATM cell stream,
means for extracting header information from said received ATM cell stream to obtain payload information,
means for storing said payload information,
means for serially transmitting said stored payload information on said synchronous circuit line stream in response to an adaptive line clock frequency, and
processor means for (a) continually monitoring the deviation in the magnitude of information stored in said storing means from a nominal value, and (b) performing open-loop adjustment of said adaptive line clock frequency.

23. Adaptive clock recovery apparatus comprising:
means for receiving asynchronous, packetized information,
means for storing said received information,
means for determining a magnitude of information stored in said storing means connected to said storing means,
means for transmitting said stored information on a synchronous circuit in response to an adaptive line clock frequency, and
a processor controlled by a stored program to continually monitor the deviation in the magnitude of information from said determining means from a nominal value and continually determine an apparent source frequency based on said monitored deviation and said adaptive line clock frequency for adjusting said adaptive line clock frequency.

24. Adaptive clock recovery apparatus comprising:
means for receiving asynchronous, packetized information,
means for storing said received information,
means for determining a magnitude of information stored in said storing means connected to said storing means,
means for transmitting said stored information on a synchronous circuit in response to an adaptive line clock frequency, and
a processor controlled by a stored program to continually monitor the deviation in the magnitude of information from said determining means from a nominal value, detect an increasing condition of said monitored deviation, and perform an open-loop adjustment of said adaptive line frequency in response to said increasing condition.

25. An interface between an ATM cell stream and a synchronous circuit line stream comprising
means for receiving said ATM cell stream, means for extracting header information from said received ATM cell stream to obtain payload information, means for storing said payload information, means for determining a magnitude of information stored in said storing means connected to said storing means, means for serially transmitting said stored payload information on said synchronous circuit line stream in response to an adaptive line clock frequency, and a processor controlled by a stored program to continually monitor the deviation in the magnitude of information from said determining means from a nominal value, detect an increasing condition of said monitored deviation, and adjust said adaptive line clock frequency in a plurality of modes in response to said detected increasing condition.

26. The interface between ATM cell stream and a synchronous circuit line stream in accordance with claim 25, wherein one of said plurality of modes is an open-loop, overcorrecting mode.

27. The interface between an ATM cell stream and a synchronous circuit line stream in accordance with claim 26, wherein a second mode of said plurality of modes is a closed-loop mode.

* * * * *